(Model.)
J. H. BERGSTROM.
HOLDER FOR GRINDING TWIST DRILLS.
No. 488,054. Patented Dec. 13, 1892.
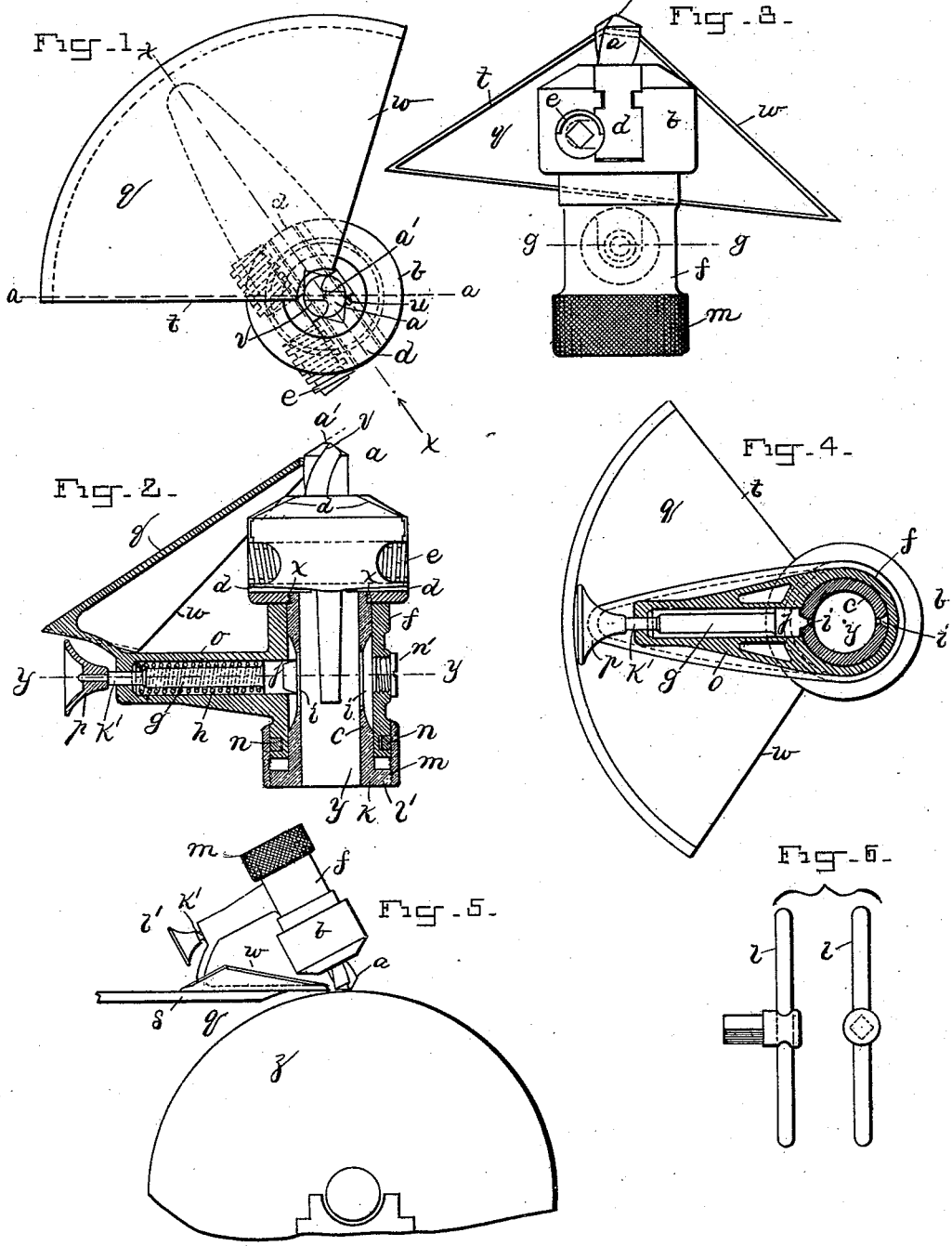
WITNESSES -
INVENTOR -

UNITED STATES PATENT OFFICE.

JOHN H. BERGSTROM, OF BROOKLYN, NEW YORK.

HOLDER FOR GRINDING TWIST-DRILLS.

SPECIFICATION forming part of Letters Patent No. 488,054, dated December 13, 1892.

Application filed September 15, 1891. Serial No. 405,811. (Model.)

*To all whom it may concern:*

Be it known that I, JOHN H. BERGSTROM, a citizen of Sweden, and a resident of Brooklyn, in the county of Kings and State of New York, have invented new and useful Improvements in Holders for Grinding Twist-Drills, of which the following is a specification.

My invention consists in the improved twist-drill holder and gage for guiding twist-drills accurately and with suitable clearance of the point, all as hereinafter fully described, reference being made to the accompanying drawings, in which—

Figure 1 is a plan view of my improved holder. Fig. 2 is an elevation, partly in section, on line $x$ $x$, Fig. 1. Fig. 3 is a side elevation as seen looking in the direction of the arrow at Fig. 1. Fig. 4 is a horizontal section on line $y$ $y$, Figs. 2 and 3. Fig. 5 is a diagram illustrating the mode of using the holder, and Fig. 6 represents a key-wrench in side and plan views for working the screw to adjust the jaws that hold the drills.

In the first place I provide any approved centering-chuck for holding the drills $a$, as the head $b$, shank $c$, jaws $d$, and screw $e$, said head and shank being connected by the screw-joint at $x$ and having the longitudinal bore $y$ for reception of the drill-shanks, the jaws being arranged to slide transversely in suitable ways in the head and the screw being arranged along one side of the jaws and geared with them by right and left hand threads, respectively, and fixed immovably lengthwise, but so as to be turned freely by a key-wrench $l$, inserted in a socket in one end to open and close the jaws, and I insert the shank of the chuck in a socket-holder $f$, so that the chuck may be turned freely to present the different sides of the drill-point to the stone, and also so that it may be shifted lengthwise to feed the drill as the grinding progresses, with a slide-bolt $g$, actuated by a spring $h$ to hold the chuck in the two positions for properly presenting the said sides of the point to the stone, the shank being suitably grooved or notched at opposite points $i$ for reception of the taper end $j$ of the bolt, and the end $k$ of the shank projecting through the holding-socket has a screw-threaded flange $l'$, on which the internally-threaded ring $m$ works to feed the drill, said ring turning freely on the end of the socket, but held against lengthwise movement by the circumferential feather $n$ inside of it and in the corresponding groove in the socket in which the feather works. The slide-bolt $g$ is arranged in a laterally-projecting arm $o$ of the socket which is bored, and the bolt and screw are inserted from the opposite side of the socket, the hole thereat being afterward closed by a plug $n'$, if desired, and the knob $p$ for pulling the bolt is attached to the projecting end of the bolt.

To the socket I attach a gage-plate $q$, constructed in the form of a segment of a hollow cone constituting a rocking and sliding gage-plate suitable for gaging the drills on the stone by lying on a flat table $s$, placed tangentially to the face of the stone $z$, with the point of the drill overhanging the edge of the table next to the stone, so as to have contact with it, and being rolled forward and backward and at the same time shifted forward and backward transversely of the way it rolls. This plate is so attached to the socket $f$ that its axis is at $u$, to which the edge $t$ is radial, while the axis of the drill is in the line $a$ $a$, parallel to the line of edge $t$, and back of it half the thickness of metal at the central portion of the point of the largest drill for which the tool is designed, so that the edge $v$ of the drill to be ground will not project in advance of the edge $t$ of the plate. The edges $v$ of drills of smaller size will fall a little short of said edge $t$ of the gage, and such may be the case with the largest without detriment, the axis of the drill being set a little farther back relatively to edge $t$ of the gage. The angle between the edges $t$ and $w$ of the gage-plate should be equal to but may be more than the angle between cutting-edge $v$ and line $a'$ of the point of the drill, and the angle between the surface of the gage-plate and its axis is less on the side of edge $w$ than on the side of edge $t$, as indicated in Figs. 2 and 3, to produce the proper clearance of the point of the drill.

I claim—

1. The combination of the socket-holder, drill-holding chuck in said holder, and the segmental conic gage-plate attached to the socket-holder, said chuck being revoluble relatively to the plate and having a stop device to hold it in the positions required, substantially as described.

2. The combination of the socket-holder, drill-holding chuck in said holder, segmental conic gage-plate attached to the socket-holder, and the spring stop-bolt, said chuck being revoluble relatively to the gage-plate, substantially as described.

3. The combination of the socket-holder, drill-holding chuck in said holder, segmental conic gage-plate, and the feed-screw, said chuck being revoluble relatively to the gage-plate and having a stop device to hold it in position, substantially as described.

4. The combination of the socket-holder, drill-holding chuck in said holder, and segmental conic gage-plate, the axis of the drill-chuck being offset back of the edge of the said plate gaging the cutting-edge of the drill, substantially as described.

5. The combination of the drill-chuck, holding-socket for said chuck, the segmental conic gage-plate attached to said socket, the locking-bolt for the shank of the chuck, the feeding-ring feathered on the socket, and the screw-flange on the shank of the chuck, substantially as described.

In testimony that I claim the foregoing as my invention I have signed my name, in presence of two witnesses, this 1st day of August, 1891.

JOHN H. BERGSTROM.

Witnesses:
W. J. MORGAN,
W. B. EARLL.